United States Patent [19]
Chrabaszcz

[11] Patent Number: 6,101,529
[45] Date of Patent: Aug. 8, 2000

[54] APPARATUS FOR UPDATING WALLPAPER FOR COMPUTER DISPLAY

[75] Inventor: Michael P. Chrabaszcz, Milpitas, Calif.

[73] Assignee: Micron Electronics, Inc., Nampa, Id.

[21] Appl. No.: 09/080,443

[22] Filed: May 18, 1998

[51] Int. Cl.[7] .................................................. G06F 13/00
[52] U.S. Cl. ............................................................ 709/203
[58] Field of Search ....................... 364/DIG. 1 MS File, 364/DIG. 2 MS File; 345/333, 335–356; 709/200, 203, 218

[56] References Cited

U.S. PATENT DOCUMENTS 5,905,492   5/1999   Straub et al. ............................ 345/335

*Primary Examiner*—Robert B Harrell
*Attorney, Agent, or Firm*—Park & Vaughan LLP

[57] ABSTRACT

One embodiment of the present invention provides an apparatus for updating wallpaper for computer display including a server coupled to a network. The apparatus also includes a wallpaper database in communication with the server, for storing a collection of wallpapers for computer display, and a user database for storing personal profiles of system users. The apparatus employs a fetching mechanism within the server for retrieving the wallpaper from the wallpaper database based upon a personal profile of a user stored in the user database. This personal profile may specify an interest of the user and may also keep track of previous accesses of the user. In one embodiment, the server includes a website through which clients can navigate and access the wallpaper database. In a variation on this embodiment, the website includes a public portion, which is accessible to any registered user via the Internet, and a private portion, which is accessible only to users who are registered to access the private portion. A further embodiment includes a mechanism within the server for registering a user so that the user has access to at least a portion of the wallpaper database. In another embodiment, the server includes a mechanism that receives a complaint regarding a user, and in response to the complaint a supervisor may remove the registration for the user. Yet another embodiment includes an updating mechanism, for accepting new wallpaper from a user and adding the new wallpaper to the wallpaper database.

20 Claims, 7 Drawing Sheets

APPARATUS FOR UPDATING WALLPAPER FOR COMPUTER DISPLAY

RELATED APPLICATION

The subject matter of this application is related to the subject matter in a co-pending non-provisional application by the same inventor(s) as the instant application and filed on the same day as the instant application entitled, "Method for Updating Wallpaper for Computer Display," having Ser. No. 09/080,576filed May 15, 1988 (Attorney Docket No. MEI-97-03708.01).

BACKGROUND

1. Field of the Invention

The present invention relates to distributed computer systems and graphical user interfaces. More particularly, the present invention relates to a system for updating a "wallpaper" for a graphical user interface by accessing a central repository for wallpaper over a network to update a wallpaper based upon personal preferences of a computer user.

2. Related Art

The advent of graphical user interfaces for computer systems has lead to the development of "wallpaper" for graphical displays. Wallpaper is typically a type of picture, graphical image or pattern used to customize a graphical user interface in an aesthetically pleasing way. In a window-based operating system such as Windows 95, produced by the Microsoft Corporation of Redmond, Wash., wallpaper often takes the form of a background picture or pattern over which windows can be opened or otherwise manipulated. Many computer users customize their background wallpaper with digitized family pictures or images relating to sports and current events. This gives computer users the ability to express their personality and interests.

At present, most computer system users use the default wallpaper bitmaps provided by operating systems such as Windows 95. Others retrieve bitmaps from a floppy drive, a CD-ROM drive, or from a publicly available source such as the Internet. In any of the above cases, a computer user must manually locate wallpaper images, transfer the images and reconfigure display options every time the wallpaper is changes. These tasks are time-consuming. Consequently, most computer users change wallpaper infrequently, if at all.

What is needed is a system that facilitates automatic updating of wallpaper with pictures tailored to specific interests of a computer user. Additionally, what is needed is a system that allows computer users with similar interests to share interesting wallpaper.

SUMMARY

One embodiment of the present invention provides an apparatus for updating wallpaper for computer display including a server coupled to a network. The apparatus also includes a wallpaper database in communication with the server, for storing a collection of wallpapers for computer display, and a user database for storing personal profiles of system users. The apparatus employs a fetching mechanism within the server for retrieving the wallpaper from the wallpaper database based upon a personal profile of a user stored in the user database. This personal profile may specify an interest of the user and may also keep track of previous accesses of the user. In one embodiment, the server includes a website through which clients can navigate and access the wallpaper database. In a variation on this embodiment, the website includes a public portion, which is accessible to any registered user via the Internet, and a private portion, which is accessible only to users who are registered to access the private portion. A further embodiment includes a mechanism within the server for registering a user so that the user has access to at least a portion of the wallpaper database. In another embodiment, the server includes a mechanism that receives a complaint regarding a user, and in response to the complaint a supervisor may remove the registration for the user. Yet another embodiment includes an updating mechanism, for accepting new wallpaper from a user and adding the new wallpaper to the wallpaper database.

DEFINITIONS

Client—a node on a computer network including computational capability and including a mechanism for communicating across the computer network.

Network—any communication channel through which computer systems can communicate with each other. This includes, but is not limited to, local area networks such as an Ethernet or a Token ring, and wide area networks such as the Internet.

Server—a node on a computer network including computational capability and usually data storage capability as well as a mechanism for servicing requests from a client for computational or data storage resources.

User Database—a database including information about computer system users. A user database may include interests of a user, and a record of previous accesses by the user.

Wallpaper—Any type of graphical image or pattern that can be used to customize a user interface for a computer system. This includes, but is not limited to backgrounds for window-based user interfaces and screen savers. Wallpaper may take the form of pictures, graphical images, patterns and possibly moving images.

Wallpaper Database—a database for storing wallpaper.

Website—a location on the Internet containing one or more screens of graphical images or text, and including a means for navigating through the screens. Websites typically contain links to other websites.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of Distributed Computing System

Figure 1:
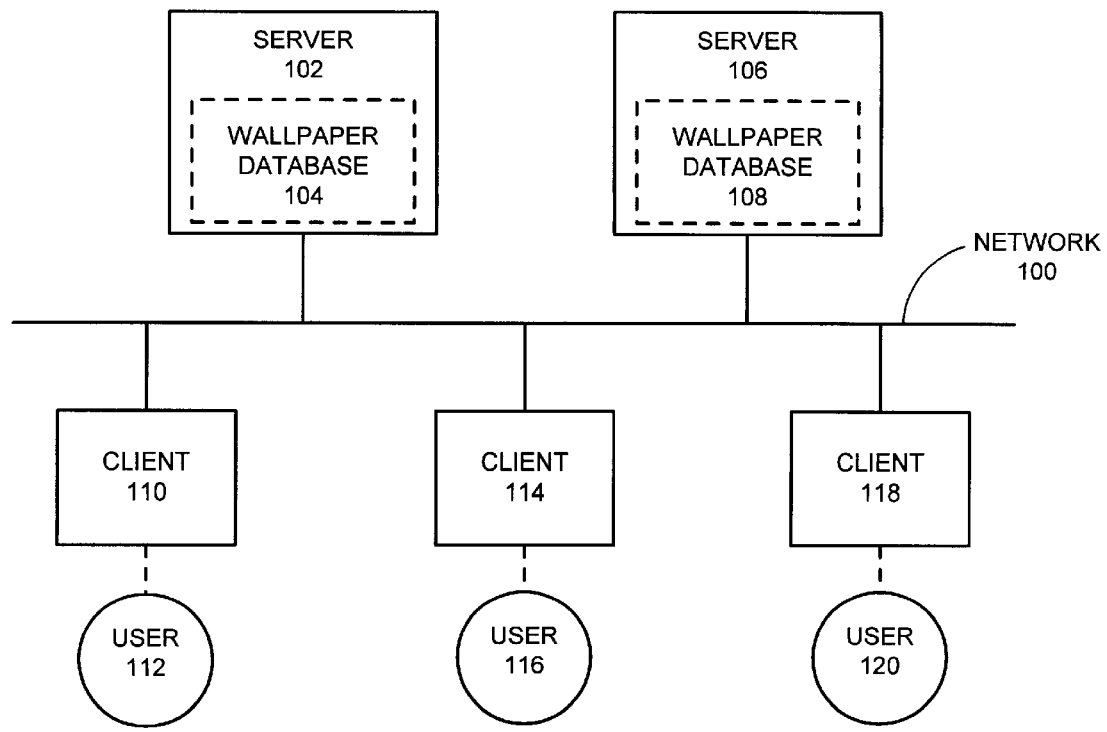
FIG. 1 is a block diagram illustrating a distributed computing system including servers 102 and 106 with wallpaper databases 104 and 108, respectively, in accordance with an embodiment of the present invention.

FIG. 1 is a block diagram illustrating a distributed computing system including servers 102 and 106 with associated wallpaper databases 104 and 108, respectively, in accordance with an embodiment of the present invention. In the illustrated embodiment, servers 102 and 106 are coupled to network 100. As defined above, a sever is a node on a computer network including computational capability and possibly data storage capability as well as a mechanism for servicing client requests for computational or data storage resources. Wallpaper databases 104 and 108 include collections of wallpaper to be accessed by clients 110, 114 and 118 across network 100. Network 100 may be any communication channel through which computer systems can communicate. This includes, but is not limited to, local area networks, such as an Ethernet or Token ring, and wide area networks, such as the Internet.

Clients 110, 114 and 118 are coupled to network 100 through which they access servers 102 and 106. A client, such as clients 110, 114 or 118 can be any node on a computer network including computational capability and including a mechanism for communicating across network 100. Clients 110, 114 and 118 are operated by users 112, 116 and 120. More specifically: client 110 is operated by user 112; client 114 is operated by user 116; and client 118 is operated by user 120. A user is typically a human being operating an associated client computer system.

During operation of the system illustrated in FIG. 1, a client, such as client 110, sends a request across network 100, requesting a wallpaper from a server, such as server 102. Server 102 selects the wallpaper from wallpaper database 104 based upon a personal profile of user 112, and then transmits the wallpaper across network 100 to client 110. Client 110 then displays the wallpaper for user 112 on a graphical user interface.

Description of Website

Figure 2:
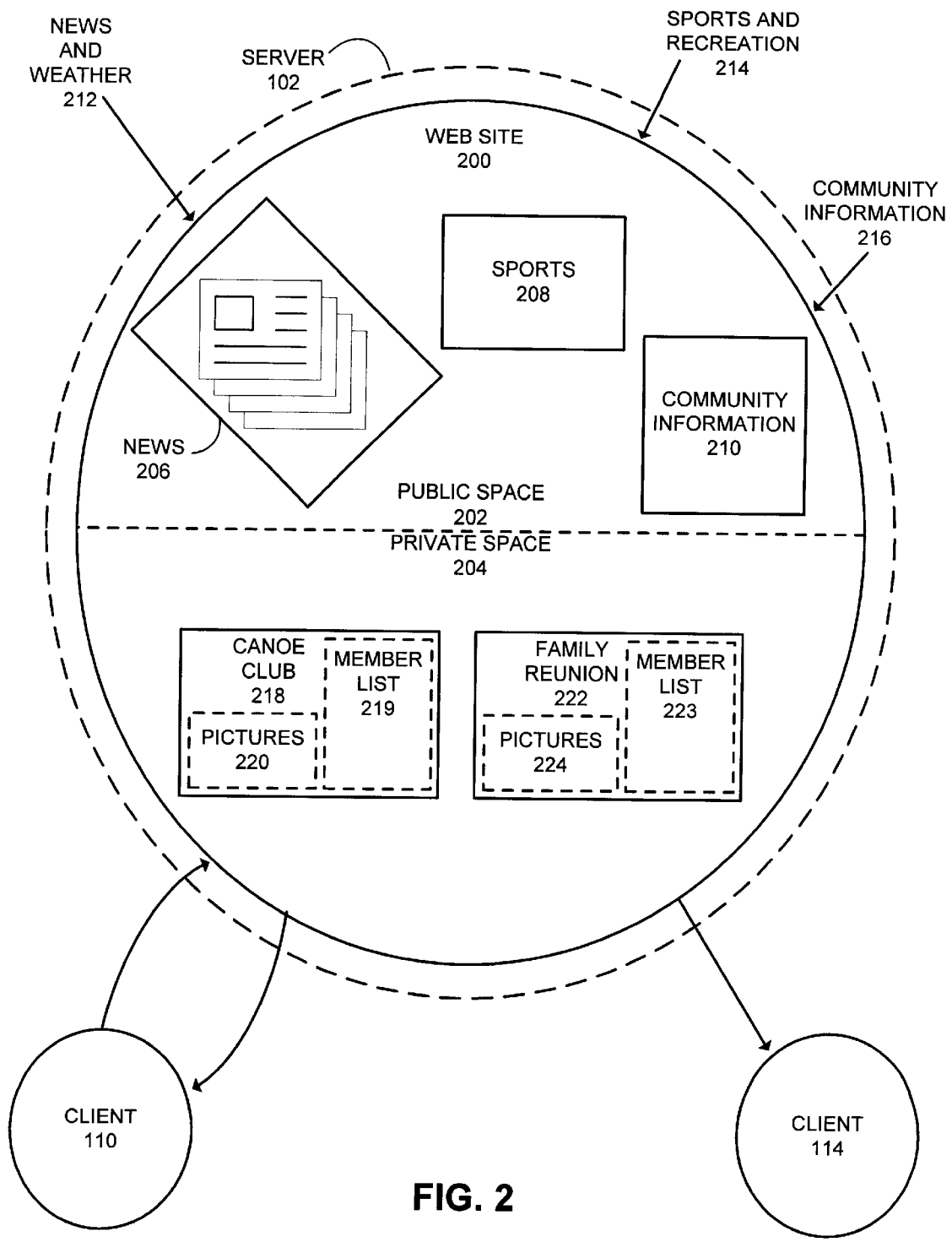
FIG. 2 is a diagram illustrating a portion of the internal structure of a website 200 including different sources for wallpaper in accordance with an embodiment of the present invention.

FIG. 2 is a diagram illustrating a portion of the internal structure of a website 200 including different sources for wallpaper in accordance with an embodiment of the present invention. In the embodiment illustrated in FIG. 2, the server side of the system is configured for access through a website 200. Website 200 resides on server 102 and comprises a public space 202, and a private space 204.

In the illustrated embodiment, public space 202 contains portions of website 200, which are generally accessible to the public across network 100. Public space 202 generally contains publicly accessible text and images, which may include wallpaper. In the illustrated embodiment, this information is arranged into groups, including news 206, sports 208 and community information 210. These groups are periodically updated with new information through various inputs across network 100, including news and weather input 212, sports and recreation input 214 and community information input 216. The above-described informational groups are presented as an example. Note that any other common grouping of publicly available data can be implemented in the same way.

In the illustrated embodiment, private space 204 contains portions of website 200, which are not available to the public over network 100. For purposes of illustration, two groups are shown within private space 204, canoe club 218, and family reunion 222. Note that a wide variety of private groups of this type are possible.

These private groups are subject to restricted access, and website 200 includes a mechanism that implements such restricted access. In the illustrated embodiment, canoe club 218 includes member list 219, which contains a list of the members that can access information from canoe club 218. Similarly, family reunion 222 includes member list 223, which contains a list of members that can access information from family reunion 122. Any other commonly known scheme for controlling access to information can be used in place of member lists 219 and 223.

Canoe club 218 includes pictures 220 and family reunion 222 includes pictures 224. These pictures are added to their respective clubs by members or creators of the clubs. For example, client 110 is illustrated in FIG. 2 as both transmitting information to add to canoe club 218, and receiving information from canoe club 218 for display as wallpaper on client 110. Client 114 is illustrated as receiving information from family reunion 222 for display on client 114.

Description of Server-Side Architecture

Figure 3:
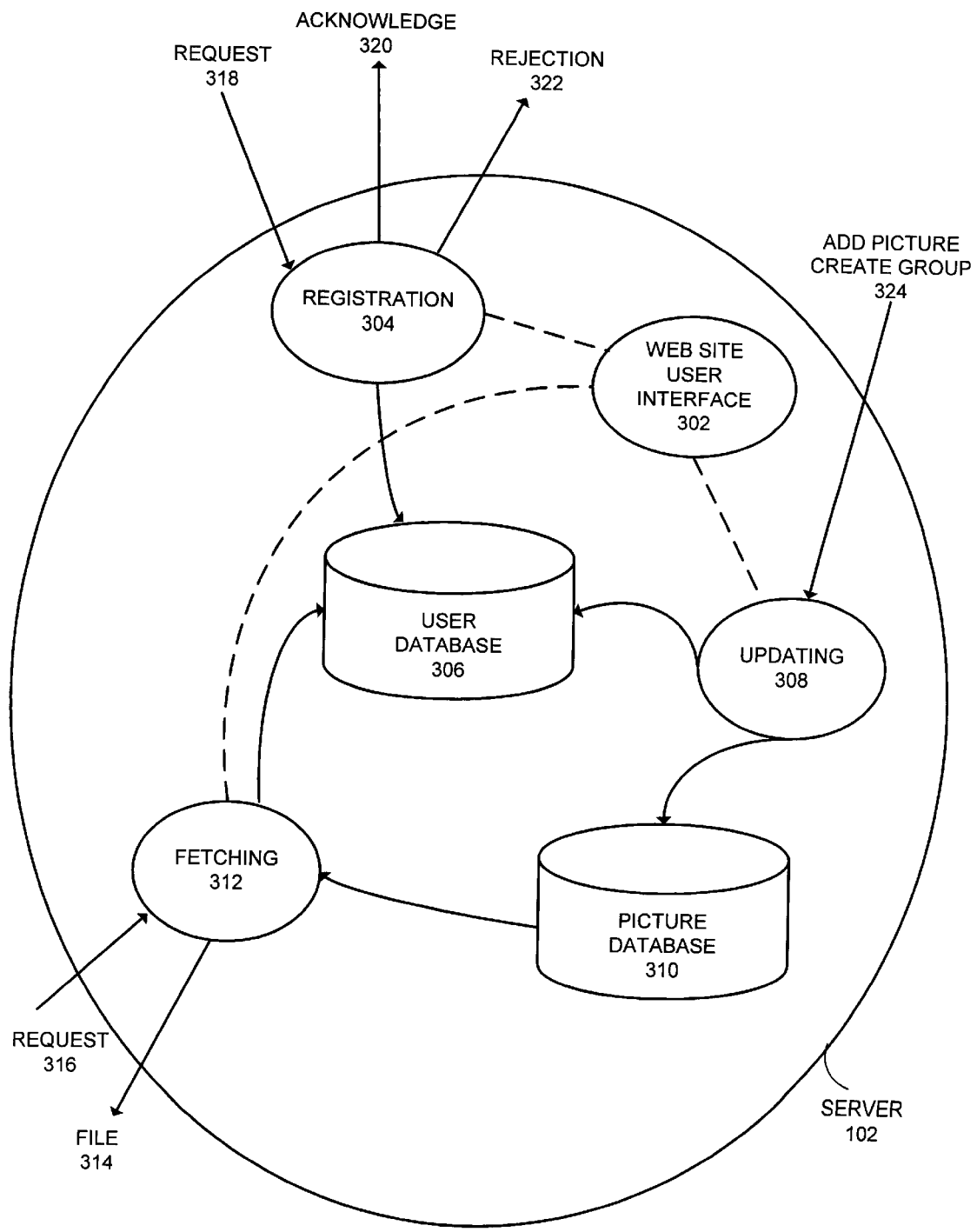
FIG. 3 is a diagram illustrating some of the functional components within server 102 from FIG. 1 in accordance with an embodiment of the present invention.

FIG. 3 is a diagram illustrating some of the functional components within server 102 from FIG. 1 in accordance with an embodiment of the present invention. In the illustrated embodiment, server 102 includes a number of functional modules. In one embodiment, these functional modules are implemented in software. However, special purpose hardware can also be used to implement the same functions. These functional components include registration mechanism 304, website interface 302, updating mechanism 308, fetching mechanism 312, user database 306 and picture database 310.

Fetching mechanism 312 receives a request 316 from a client, such as client 110 from FIG. 1, and returns a file 314. File 314 contains a wallpaper for display on client 110. Upon receiving request 316, fetching mechanism 312 references user database 306 to determine a personal profile for the user who generated the request. User database 306 may include a collection of personal profiles for various users of server 102. A personal profile for a user can contain information on interests and affiliations of the user, and may additionally contain information on what items and areas the user has referenced in the past, as well as the user's security rights. Fetching mechanism 312 uses this personal profile to select a wallpaper from picture database 310. Picture database 310 is a database that can contain wallpapers for access by clients.

Registration mechanism 304 receives a request 318 to register a user on server 102. Registration mechanism can return an acknowledgement signal 320 acknowledging the registration, or a rejection signal 322 indicating that the registration request is rejected. Server 102 additionally includes updating mechanism 308, which receives from a client either a picture to add to picture database 310, or a request to create a group 324. Users with a given security level are permitted to delete wallpapers, groups or members. Updating mechanism 308 next creates a new group on server 102, or adds the picture to an existing group, so that the picture is stored in picture database 310.

Website interface 302 allows a user to control the operation of registration mechanism 304, fetching mechanism 312 and updating mechanism 308 by navigating through the various groups on server 102.

Description of Client-Side Architecture

Figure 4:
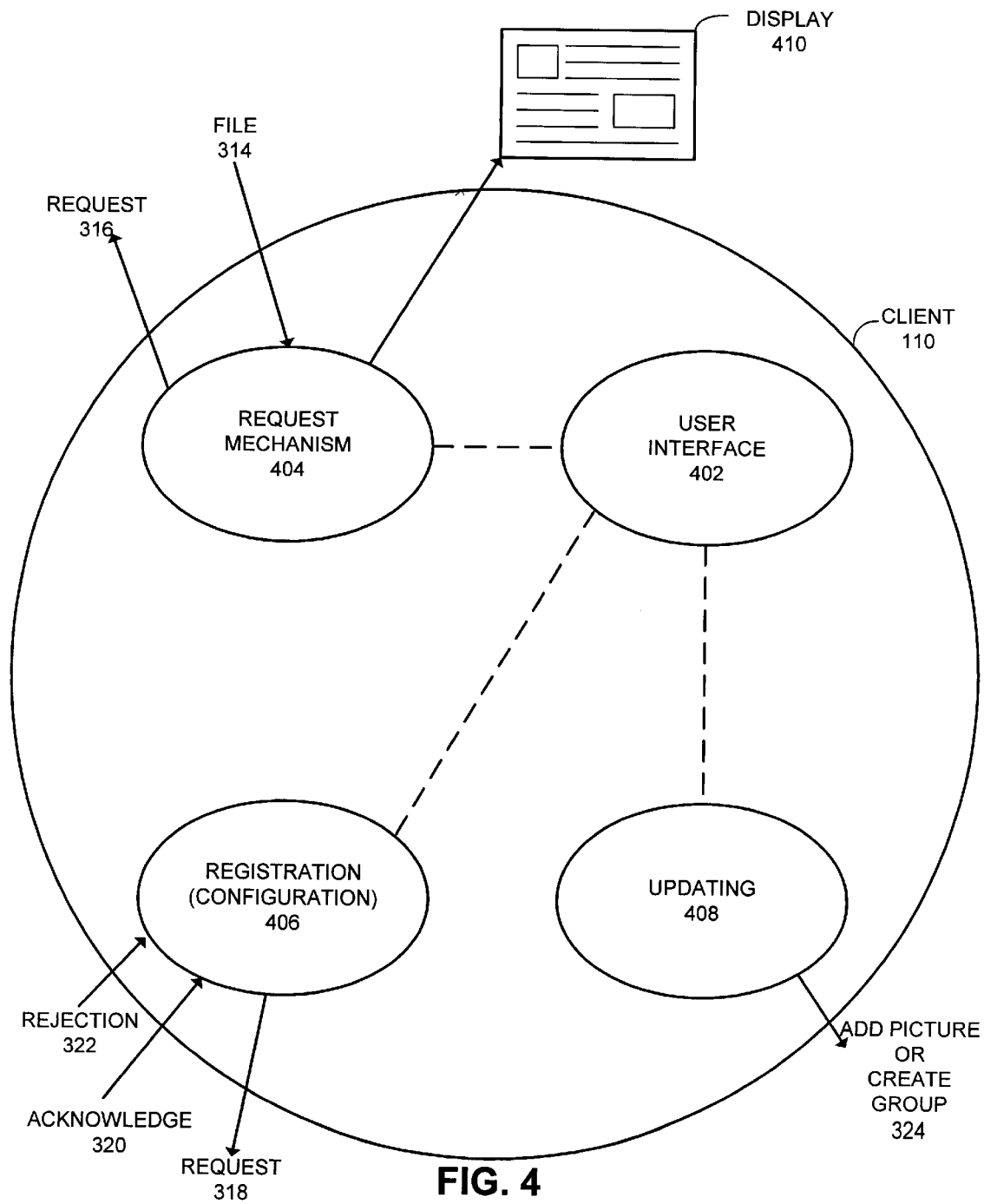
FIG. 4 is a diagram illustrating some of the functional components within client 110 from FIG. 1 in accordance with an embodiment of the present invention.

FIG. 4 is a diagram illustrating some of the functional components within client 110 from FIG. 1 in accordance with an embodiment of the present invention. In this embodiment, client 110 includes request mechanism 404, registration mechanism 406, updating mechanism 408 and user interface 402.

Request mechanism 404 generates a request from client 110 to a server, such as sever 102, to retrieve a wallpaper for a user 112 on client 110. In response to this request, server 102 returns file 314, which may include wallpaper. This wallpaper is outputted to display 410 for viewing by user 112 as part of a graphical user interface.

Updating mechanism 408 accepts a command from user 112 to add a picture or create a group on server 102. It then sends a request 324 to server 102 across network 100 to add the picture or create the group.

Registration mechanism submits a request 318 to register with server 102. This request may further specify a particular group on server 102 to register with. Registration mechanism 406 then receives either an acknowledgement signal 320 acknowledging the registration, or a rejection signal 322. The above-described components within client 110 all operate under control of user interface 402. User interface 402 allows user 112 to initiate and control the actions of request mechanism 404, registration mechanism 406 and updating mechanism 408.

Description of Personal Profile

Figure 5:
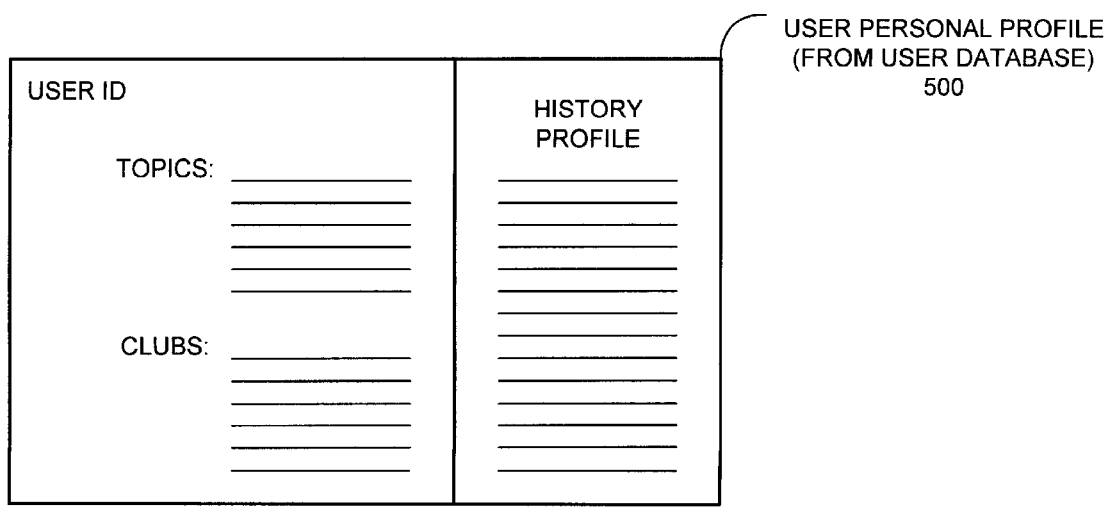
FIG. 5 is a diagram illustrating a possible structure of a personal profile 500 in user database 306 from FIG. 3 in accordance with an embodiment of the present invention.

FIG. 5 is a diagram illustrating a possible structure of a personal profile 500 contained in user database 306 from FIG. 3 in accordance with an embodiment of the present invention. Personal profile 500 contains information for a user of server 102, such as user 112 on client 110. In the illustrated embodiment, personal profile 500 contains a user ID, a list of topics, a list of clubs, a security list specifying security rights for the user and a history profile. The user ID includes an identifier to uniquely identify the user. The list of topics specifies particular interests or topics that the user has shown interest in. The security list specifies the user's rights to perform actions on various clubs. These actions can include adding users, deleting users and updating wallpapers. The history profile includes information regarding which items the user has accessed in the past to ensure that the user does not receive the same wallpaper twice. The history profile additionally includes information on which topics and interest areas the user has accessed in the past. This historical information can be used to select a wallpaper for the user.

Description of System Operation

Figure 6:
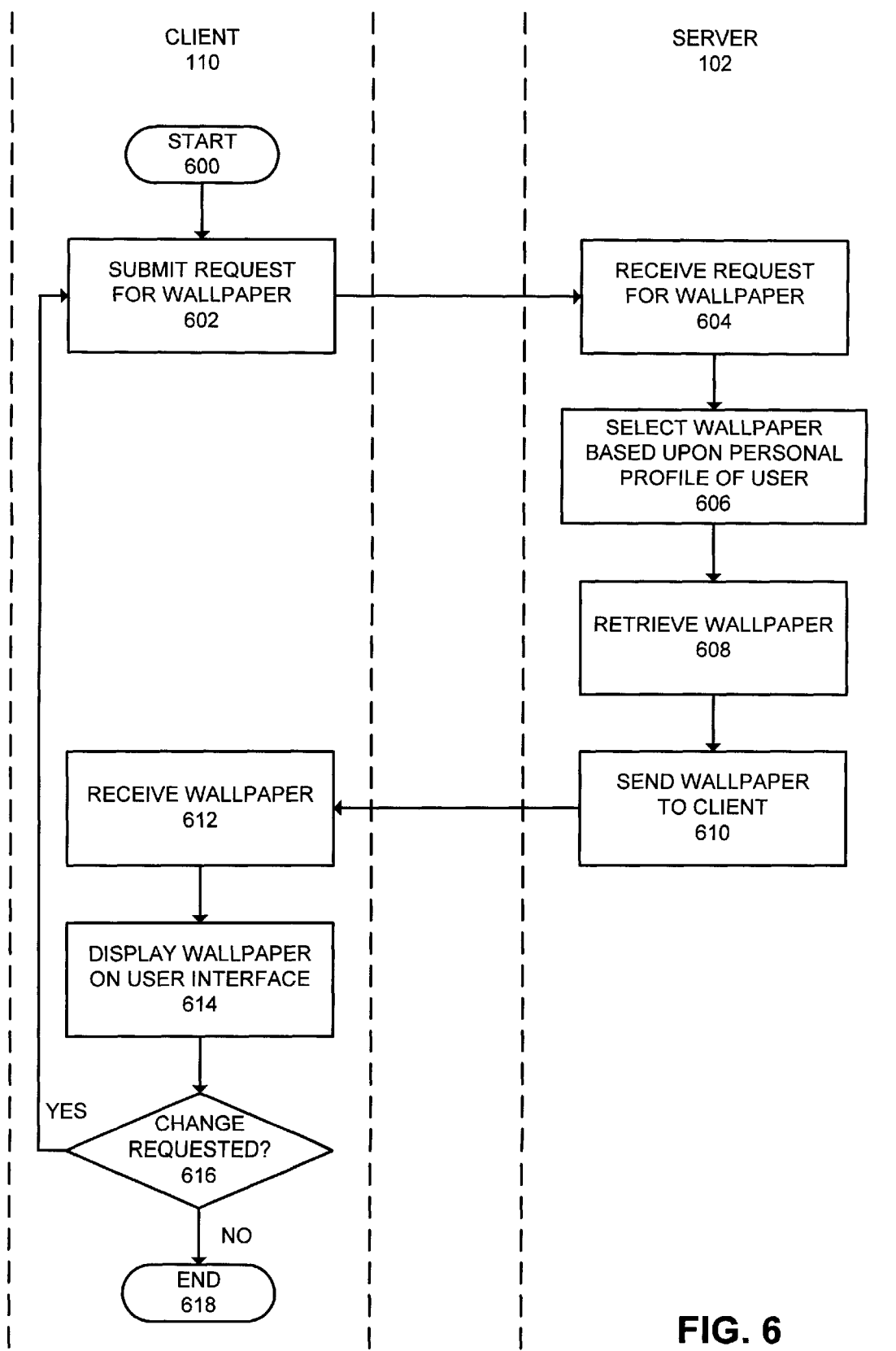
FIG. 6 is a flow chart illustrating some of the steps involved in retrieving wallpaper for client 110 from server 102 in accordance with an embodiment of the present invention.

FIG. 6 is a flow chart illustrating some of the steps involved in retrieving a wallpaper for a client 110 from a server 102 in accordance with an embodiment of the present invention. This flow chart is divided into two columns. The left-hand column represents the activities of client 110 and the right-hand column represents the activities of server 102. The system starts in state 600 and proceeds to state 602.

In state 602, the client submits a request for wallpaper. This request may be generated in a number of ways: user 112 may initiate a request through user interface 402 (from FIG. 4); client 110 may automatically generate a request upon system startup; or client 110 may automatically generate a periodic request to refresh the wallpaper. The system next proceeds to state 604. In state 604, server 102 receives the request for the wallpaper; this request specifies the identity of a user 112 on client 110 that requested the wallpaper. The system next proceeds to state 606. In state 606, server 102 selects personal profile 500 for user 112 from user database 306 (from FIG. 3). Server 102 uses this personal profile to select a wallpaper for user 112 based upon personal profile 500. The system next proceeds to state 608.

In state 608, server 102 retrieves the wallpaper from picture database 310 (from FIG. 3). In the embodiment illustrated in FIG. 3, picture database 310 resides within server 102. In another embodiment, picture database 310 is distributed across network 100 (see FIG. 1). In this embodiment, server 102 reaches out across network 100 to retrieve the selected wallpaper. The system next proceeds to state 610 in which server 102 sends the retrieved wallpaper to client 110 across network 610. The system next proceeds to state 612.

In state 612, client 110 receives the wallpaper from server 102. The system next proceeds to state 614. In state 614, client 110 displays the wallpaper as part of a graphical user interface on display 410 (from FIG. 4). The system next proceeds to state 616. In state 616, client 110 determines if user 112 would like to change the newly displayed wallpaper. If so, the system returns to state 602 to repeat the process in order to retrieve an alternate wallpaper. If not, the system proceeds to state 618, which is an end state.

Figure 7:
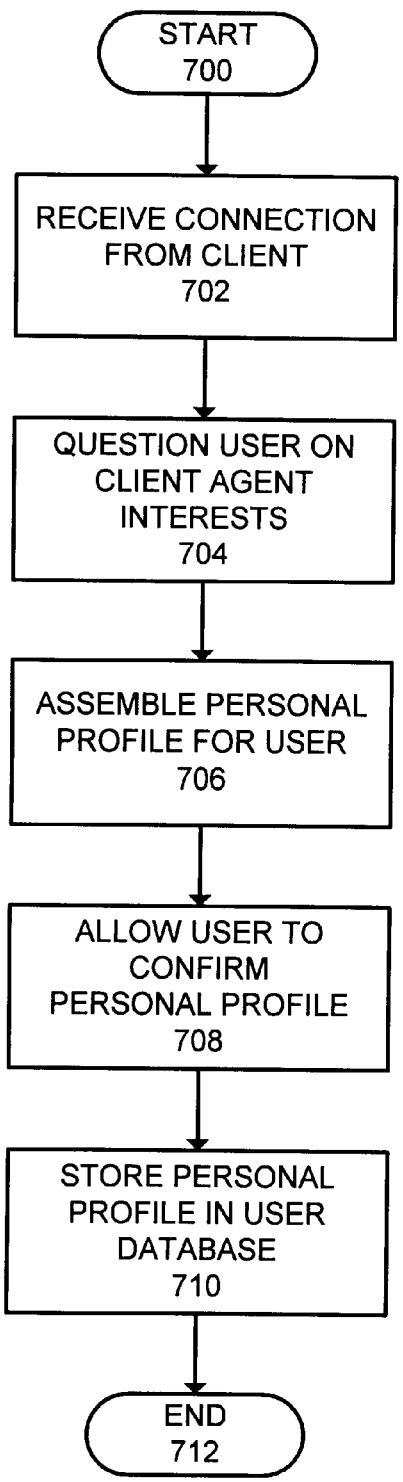
FIG. 7 is a flow chart illustrating some of the steps involved in registering client 110 on server 102 in accordance with an embodiment of the present invention.

FIG. 7 is a flow chart illustrating some of the steps involved in registering a new user 112 on a server 102 in accordance with an embodiment of the present invention. The system starts in state 700 and proceeds to state 702. In state 702, server 102 receives a connection from the new user 112 on client 110. The system next proceeds to state 704. In state 704, registration mechanism 304 (from FIG. 3) within server 102 questions user 112 about particular interests of user 112. This questioning process may involve multiple communications between client 110 and server 102 across network 100. The system next proceeds to state 706. In state 706, registration mechanism 304 assembles a personal profile 500 for user 112 based upon responses of user 112 to the questioning. The system next proceeds to state 708. In state 708, the system allows user 112 to confirm information in personal profile 500 and to change any information that may be incorrect. The system next proceeds to state 710. In state 710, the system stores the personal profile 500 in user database 306 (from FIG. 3). At this point the registration process is complete. The system next proceeds to state 712, which is an end state.

Figure 8:
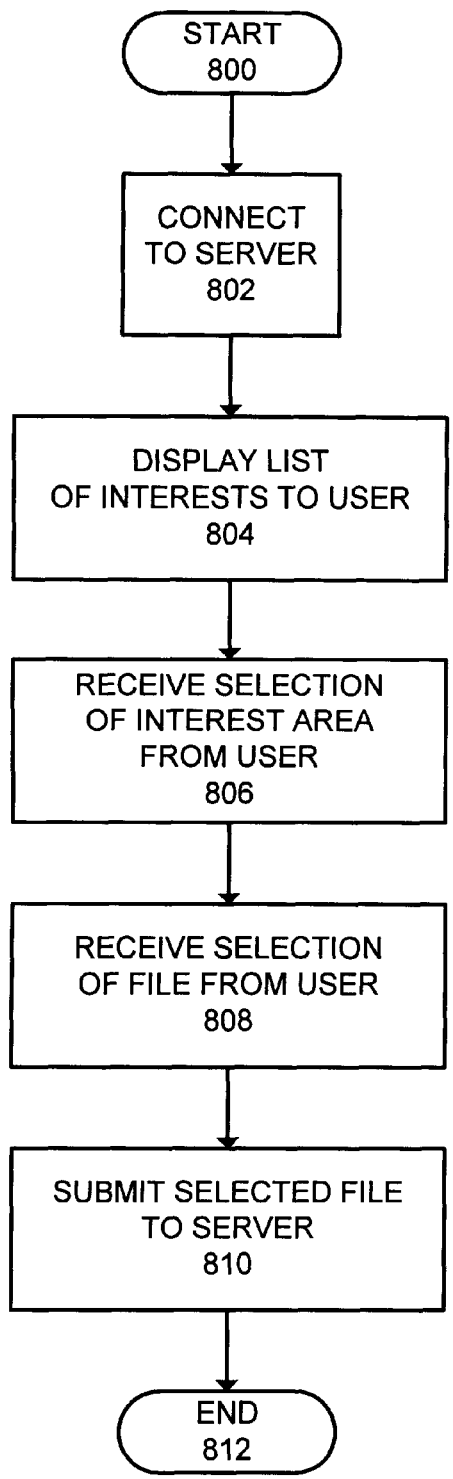
FIG. 8 is a flow chart illustrating some of the steps involved in adding wallpaper to a database in accordance with an embodiment of the present invention.

FIG. 8 is a flow chart illustrating some of the steps involved in adding wallpaper to a database in accordance with an embodiment of the present invention. The system starts in state 800 and proceeds to state 802. In state 802, client 110 (from FIG. 1) connects to server 102. The system next proceeds to state 804. In state 804, client 110 displays a list of interests to user 112 on display 410 (from FIG. 4). In one embodiment, this list of interests is retrieved from server 102 across network 100. The system next proceeds to state 806 in which client 110 receives a selection of an interest area from user 112. The system next proceeds to state 808. In state 808, client 110 receives a selection of a file 314 from user 112. The system next proceeds to state 810, in which client 110 submits file 314 to server 102 across network 810. The system, next proceeds to state 812, which is an end state. Not shown in FIG. 8 are the actions of server 102 in adding file 314 to picture database 310. These actions are described above with reference to updating mechanism 308 in FIG. 3.

CONCLUSION

One embodiment of the present invention provides a system that facilitates automatic updating of wallpaper on a computer display with pictures that are of specific interest to the computer user. Additionally, the present invention allows computer users with similar interests to share interesting wallpaper.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. An apparatus for updating a wallpaper for computer display, comprising:
   a server coupled to a network;
   a web site within the server, the web site providing an interface through which clients can access a collection of wallpapers for computer display;
   wherein the website facilitates accesses to a plurality of groups, each group being associated with a list of members so that only members of each group are allowed to access a private collection of wallpapers associated with each group;
   wherein only members of a given group from the plurality of groups are allowed to add wallpapers to the private collection of wallpapers associated with the given group;
   a wallpaper database in communication with the server, for storing the collection of wallpapers for computer display;
   a user database within the server for storing personal profiles of at least one user; and
   a fetching mechanism within the server, for retrieving the wallpaper from the wallpaper database for a user on a client based upon a personal profile of the user in the user database.

2. The apparatus of claim 1, wherein the network includes the Internet.

3. The apparatus of claim 2, wherein the website comprises:
   a public portion that is accessible to any user on the Internet; and
   a private portion that is accessible only to users who are registered to access the private portion.

4. The apparatus of claim 1, further comprising a registration mechanism within the server for registering the at least one user on the at least one client so that the at least one user has access to at least a portion of the wallpaper database.

5. The apparatus of claim 4, wherein the registration mechanism includes a mechanism that receives a complaint regarding the user, and based on the complaint removes a registration for the user.

6. The apparatus of claim 1, further comprising an updating mechanism, for accepting a new wallpaper from the user and adding the new wallpaper to the wallpaper database if the user is a member of a group to which the wallpaper is added.

7. The apparatus of claim 1, wherein the fetching mechanism retrieves the wallpaper from the wallpaper database based upon an interest of the user.

8. The apparatus of claim 1, wherein the fetching mechanism retrieves the wallpaper from the wallpaper database based upon interest areas and wallpapers that have been previously accessed by the user.

9. The apparatus of claim 1, wherein the wallpaper database is distributed across the network.

10. The apparatus of claim 1, wherein the wallpaper database is contained within the server.

11. An apparatus for updating a wallpaper for computer display, comprising:
    a network;
    a server coupled to the network;
    a web site within the server, the web site providing an interface through which clients can access a collection of wallpapers for computer display;
    wherein the website facilitates accesses to a plurality of groups, each group being associated with a list of members so that only members of each group are allowed to access a private collection of wallpapers associated with each group;
    wherein only members of a given group from the plurality of groups are allowed to add wallpapers to the private collection of wallpapers associated with the given group;
    a client coupled to the network;
    a wallpaper database in communication with the server, for storing a collection of wallpapers for computer display;
    a user database within the server for storing personal profiles of at least one user; and
    a fetching mechanism within the server, for retrieving the wallpaper from the wallpaper database for a user on the client based upon a personal profile of the user in the user database.

12. The apparatus of claim 11, further comprising a request mechanism within the client, wherein the request mechanism periodically sends a request to the server to send a new wallpaper to the client.

13. The apparatus of claim 11, further comprising a request mechanism within the client, wherein the request mechanism sends a request to the server to send a new wallpaper to the client during a system initialization on the client.

14. The apparatus of claim 11, further comprising a registration mechanism within the client, for registering the client so that the client has access to at least a portion of the wallpaper database.

15. The apparatus of claim 11, wherein the web site is configured to receive an input from the user specifying an interaction with the wallpaper database.

16. An apparatus for updating a wallpaper for computer display, comprising:
    a client coupled to a network;
    a request mechanism within the client that sends a request to a server to send a new wallpaper to the client;
    wherein the request is directed a web site within the server, the web site providing an interface through which the client can access a collection of wallpapers for computer display;
    wherein the website facilitates accesses to a plurality of groups, each group being associated with a list of members so that only members of each group are allowed to access a private collection of wallpapers associated with each group;

wherein only members of a given group from the plurality of groups are allowed to add wallpapers to the private collection of wallpapers associated with the given group;

a user interface within the client, for receiving an input from a user specifying an operation involving wallpaper; and a display within the client for displaying the wallpaper.

17. The apparatus of claim 16, further comprising a registration mechanism within the client, for registering with the server at least one user so that the at least one user has access to at least a portion of a wallpaper database coupled to the server.

18. The apparatus of claim 16, wherein the request mechanism periodically sends a new request to the server to send the new wallpaper to the client.

19. The apparatus of claim 16, wherein the request mechanism sends a new request to the server to send the new wallpaper to the client during a system initialization on the client.

20. A program storage device storing instructions that when executed by a computer cause the computer to perform a method for updating a wallpaper for computer display, comprising:

receiving, at a server, a request from a client to fetch the wallpaper for computer display;

wherein the request is received through a web site within the server, the web site providing an interface through which clients can access a collection of wallpapers for computer display;

wherein the website facilitates accesses to a plurality of groups, each group being associated with a list of members so that only members of each group are allowed to access a private collection of wallpapers associated with each group;

wherein only members of a given group from the plurality of groups are allowed to add wallpapers to the private collection of wallpapers associated with the given group;

retrieving, at the server, the wallpaper for the client, the wallpaper being retrieved from a private collection of wallpaper for a group if the request originates from a member of the group; and sending the wallpaper across a network to the client.

* * * * *